US011371742B2

(12) United States Patent
Chu et al.

(10) Patent No.: US 11,371,742 B2
(45) Date of Patent: Jun. 28, 2022

(54) AIR CONDITIONER AND METHOD FOR CONTROLLING SAME

(71) Applicant: Samsung Electronics Co., Ltd., Suwon-si (KR)

(72) Inventors: Euy-sung Chu, Suwon-si (KR); Kwang-seung Lee, Suwon-si (KR); Ji-su Lee, Suwon-si (KR); Won Choe, Yongin-si (KR); Jae-kwon Ko, Uiwang-si (KR); Moon-sun Shin, Suwon-si (KR); In-chul Yun, Yongin-si (KR); Se-kwan Jeong, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 10 days.

(21) Appl. No.: 15/733,323

(22) PCT Filed: Feb. 14, 2018

(86) PCT No.: PCT/KR2018/001962
§ 371 (c)(1),
(2) Date: Jun. 26, 2020

(87) PCT Pub. No.: WO2019/132111
PCT Pub. Date: Jul. 4, 2019

(65) Prior Publication Data
US 2020/0326090 A1    Oct. 15, 2020

(30) Foreign Application Priority Data

Dec. 26, 2017  (KR) .......................... 10-2017-0180111

(51) Int. Cl.
*F24F 11/65*     (2018.01)
*G05B 19/042*    (2006.01)
(Continued)

(52) U.S. Cl.
CPC .............. *F24F 11/65* (2018.01); *F24F 11/39* (2018.01); *G01N 21/47* (2013.01);
(Continued)

(58) Field of Classification Search
None
See application file for complete search history.

(56) References Cited

U.S. PATENT DOCUMENTS 8,243,274 B2 *  8/2012  Aiken ................. G01M 15/108
                                                    356/438
10,914,483 B2 *  2/2021  Kim ....................... B01D 46/46
(Continued)

FOREIGN PATENT DOCUMENTS

EP       3367183 A1 *  8/2018 ............. G05B 15/02
KR   10-2006-0026319 A    3/2006
(Continued)

OTHER PUBLICATIONS

International Search Report of the International Searching Authority in connection with International Application No. PCT/KR2018/001962 dated Sep. 18, 2018, 4 pages.
(Continued)

*Primary Examiner* — Lina M Cordero

(57) ABSTRACT

The disclosure relates to an air conditioner and a control method thereof, the air conditioner including: a housing including an inlet and an outlet through which air is introduced and discharged; a fan driver configured to drive air introduced through the inlet to be discharged through the outlet; a filter configured to filter the introduced air; a sensor configured to detect a foreign material in air; a storage configured to store information; and a processor configured to control the storage to store information about mass concentration of the foreign material in air detected by the sensor, and calculate a remaining life of the filter based on
(Continued)

the information stored in the storage. Thus, the air conditioner can identify proper time to replace the filter by calculating the remaining life of the filter.

13 Claims, 12 Drawing Sheets

(51) Int. Cl.
    *F24F 11/39*         (2018.01)
    *G01N 21/47*        (2006.01)
    *F24F 110/65*      (2018.01)

(52) U.S. Cl.
    CPC ....... *G01N 21/4738* (2013.01); *G05B 19/042* (2013.01); *F24F 2110/65* (2018.01); *G05B 2219/2614* (2013.01)

(56) References Cited

U.S. PATENT DOCUMENTS

| | | | | |
|---|---|---|---|---|
| 2014/0311339 | A1* | 10/2014 | Chan | F24F 8/10 95/12 |
| 2016/0121251 | A1* | 5/2016 | Baek | B01D 46/0086 96/417 |
| 2019/0154290 | A1* | 5/2019 | Kim | B01D 46/12 |
| 2019/0285753 | A1* | 9/2019 | Spruit | G01S 7/497 |
| 2020/0141604 | A1* | 5/2020 | Chen | F24F 11/58 |

FOREIGN PATENT DOCUMENTS

| | | | | |
|---|---|---|---|---|
| KR | 10-2009-0035375 A | 4/2009 | | |
| KR | 10-2010-0089605 A | 8/2010 | | |
| KR | 101264612 B1 * | 5/2013 | ......... | B01D 46/0086 |
| KR | 10-1326383 B1 | 11/2013 | | |
| KR | 20150139663 A * | 12/2015 | | |
| KR | 10-2016-0116264 A | 10/2016 | | |
| KR | 10-2017-0071208 A | 6/2017 | | |
| KR | 10-2017-0086253 A | 7/2017 | | |
| KR | 10-2017-0136885 A | 12/2017 | | |
| WO | 2017179743 A1 | 10/2017 | | |

OTHER PUBLICATIONS

Korean Intellectual Property Office "Office Action" dated Feb. 8, 2022, in connection with Korean Patent Application No. 10-2017-0180111, 12 pages.

* cited by examiner

FIG. 10

| REFERENCES FOR MEASURED DUST VALUES | |
|---|---|
| FIRST DUST LEVEL | A mg |
| SECOND DUST LEVEL | B mg |
| THIRD DUST LEVEL | C mg |
| FOURTH DUST LEVEL | D mg |

| REFERENCES FOR USE TIME | |
|---|---|
| FIRST TIME LEVEL | A TIME |
| SECOND TIME LEVEL | B TIME |
| THIRD TIME LEVEL | C TIME |
| FOURTH TIME LEVEL | D TIME |

AIR CONDITIONER AND METHOD FOR CONTROLLING SAME

CROSS-REFERENCE TO RELATED APPLICATIONS

This application is a 371 National Stage of International Application No. PCT/KR2018/001962, filed Feb. 14, 2018, which claims priority to Korean Patent Application No. 10-2017-0180111, filed Dec. 26, 2017, the disclosures of which are herein incorporated by reference in their entirety.

BACKGROUND

1. Field

The disclosure relates to an air cleaner with a replaceable filter and a control method thereof, and more particularly to an air conditioner in which a filter is replaceable considering the remaining life of the filter and a control method thereof.

2. Description of Related Art

An air conditioner refers to an apparatus provided to control properties such as temperature, humidity, cleanness, air current, etc. in response to a use space. The air conditioner basically includes an air blower forming air current, and changes at least one of properties of air circulated by the air blower, thereby making the environment of the use space comfortable for a user. The air conditioner is classified according to the properties of air to be controlled, and may for example include an air cooler for cooling air, a dehumidifier for lowering humidity of air, an air cleaner for enhancing cleanness of air.

The air cleaner refers to an apparatus for filtering out fine dust or gas from air in a space such as a room, etc. and additionally sterilizing air. Specifically, the air cleaner sucks polluted indoor air, moves the sucked air into a housing, and filters out dust, odor particles, etc. from the air, thereby purifying air and discharging the purified air out of the housing. The air cleaner purifies air by adsorbing dust, odor particles, etc. of air onto a filter. As dust and odor particles adsorbed onto the filter increase, the performance of the filter is gradually decreased. To efficiently use the air cleaner, the filter needs to be replaced on a proper cycle. In a conventional air cleaner, the air cleaner identifies the performance of the filter, or a user checks the state of the filter with the naked eyes, thereby calculating the remaining life of the filter.

However, according to the related art, when the air cleaner identifies the performance of the filter without user intervention, use environment of the air cleaner is not taken into account and therefore it is impossible to accurately calculate the remaining life of the filter for the replacement.

Further, it is inconvenient for a user to check the state of the filter with the naked eyes in order to accurately check the performance of the filter.

Accordingly, there is a need of an air cleaner capable of identifying proper time to replace the filter of the air cleaner without user intervention.

SUMMARY

Accordingly, an aspect of the disclosure is to provide an air conditioner, a control method thereof, and a computer program product, in which a remaining life of a filter is more accurately calculated.

According to an embodiment of the disclosure, an air conditioner includes: a housing including an inlet and an outlet through which air is introduced and discharged; a fan driver configured to drive air introduced through the inlet to be discharged through the outlet; a filter configured to filter out the introduced air; a sensor configured to detect a foreign material in air; a storage configured to store information; and a processor configured to control the storage to store information about mass concentration of the foreign material in air detected by the sensor, and calculate a remaining life of the filter based on the information stored in the storage. Thus, the air conditioner can identify proper time to replace the filter by calculating the remaining life of the filter.

The sensor may be configured to obtain detection information by detecting a laser reflected from the foreign material, and the processor may be configured to identify the mass concentration of the foreign material based on the detection information obtained by the sensor.

The sensor may be configured to emit a laser to air and detects a scattering level of a laser reflected from the foreign material, and the processor may be configured to identify the mass concentration of the foreign material based on the detected scattering level.

The filter may be provided at a side of the inlet, and configured to filter air introduced through the inlet.

The sensor may be provided in a space isolated from a channel.

The sensor may be provided near the inlet.

The sensor may be configured to detect a foreign material in air in a channel between the inlet and the filter.

The storage may be configured to store preset information about a correlation between the mass concentration of the foreign material and a remaining life of the filter, and the processor may be configured to identify the remaining life of the filter based on the stored information.

The processor may be configured to calculate accumulated dust quantity of the filter based on the information stored in the storage.

The processor may be configured to calculate the accumulated dust quantity based on use time of the air conditioner, an air volume value, and the mass concentration of the foreign material in air.

The processor may be configured to compensate for the air volume value based on at least one of the use time or the accumulated dust quantity.

According to an embodiment of the disclosure, a method of controlling an air conditioner including a housing, a fan driver, a filter, a sensor, and a storage includes: storing information about mass concentration of a foreign material in air, which is introduced through an inlet of the housing and detected by the sensor, in the storage; and calculating a remaining life of the filter based on the stored information. Thus, the air conditioner can identify proper time to replace the filter by calculating the remaining life of the filter.

The method may further include: by the sensor, obtaining detection information by detecting a laser reflected from the foreign material; and identifying the mass concentration of the foreign material based on the detection information obtained by the sensor.

The method may further include: by the sensor, emitting a laser to air and detecting a scattering level of a laser reflected from the foreign material; and identifying the mass concentration of the foreign material based on the detected scattering level.

The method may further include: storing preset information about a correlation between the mass concentration of the foreign material and a remaining life of the filter, in the storage; and identifying the remaining life of the filter based on the stored information.

The method may further include: calculating accumulated dust quantity of the filter based on the stored information.

The method may further include: calculating the accumulated dust quantity based on use time of the air conditioner, an air volume value, and the mass concentration of the foreign material in air.

The method may further include: compensating for the air volume value based on at least one of the use time or the accumulated dust quantity.

As described above, according to the disclosure, an air conditioner calculates a remaining life of a filter and identifies proper time to replace the filter.

BRIEF DESCRIPTION OF THE DRAWINGS

FIG. 10 shows values set in an air conditioner according to an embodiment of the disclosure.

DETAILED DESCRIPTION

Figure 1:
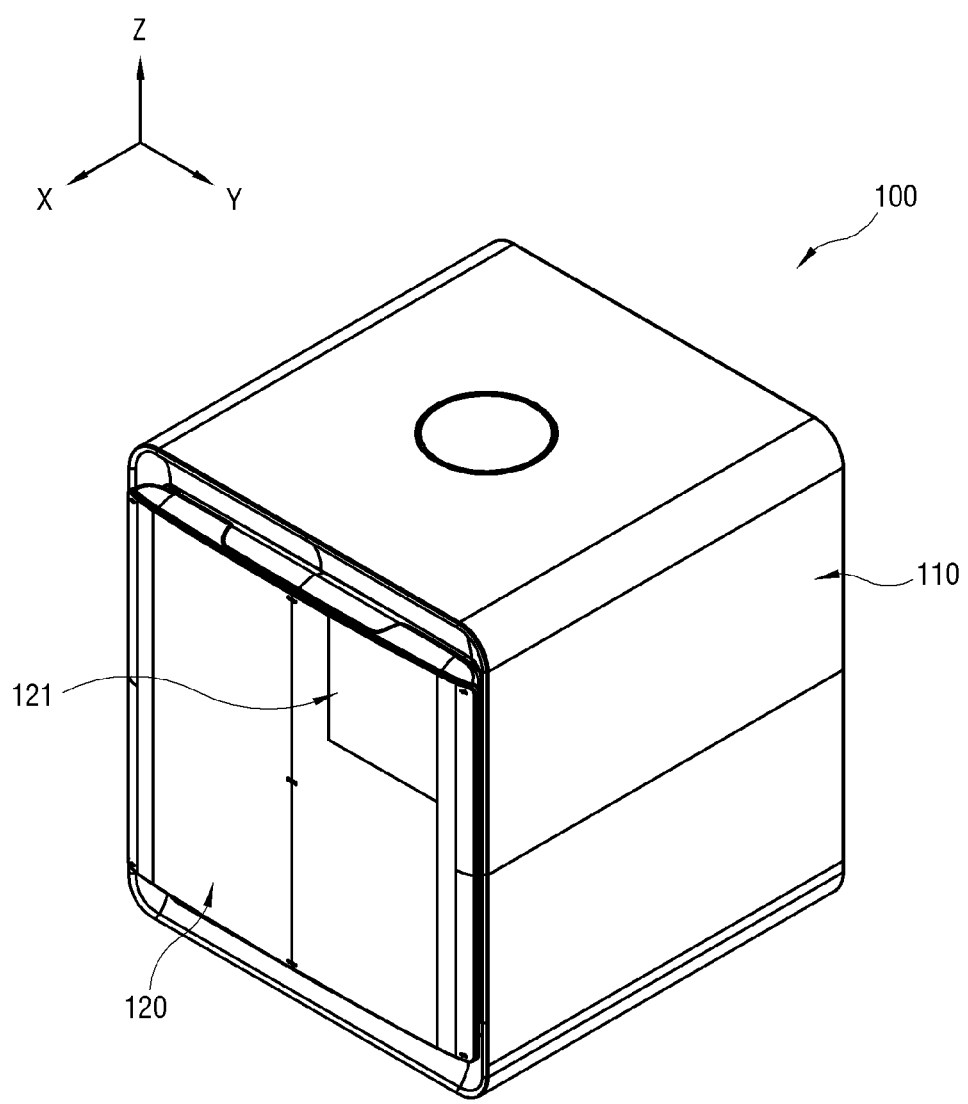
FIG. 1 shows a perspective view of an outer appearance of an air conditioner of according to an embodiment of the disclosure.

Below, embodiments of the disclosure will be described in detail with reference to the accompanying drawings. In the drawings, like numerals or symbols refer to like elements having substantially the same function, and the size of each element may be exaggerated for clarity and convenience of description. However, the technical concept of the disclosure and its key configurations and functions are not limited to those described in the following embodiments. In the following descriptions, details about publicly known technologies or configurations may be omitted if they unnecessarily obscure the gist of the disclosure.

In the following embodiments, terms 'first', 'second', etc. are used only to distinguish one element from another, and singular forms are intended to include plural forms unless otherwise mentioned contextually. In the following embodiments, it will be understood that terms 'comprise', 'include', 'have', etc. do not preclude the presence or addition of one or more other features, numbers, steps, operation, elements, components or combination thereof. In addition, a 'module' or a 'portion' may perform at least one function or operation, be achieved by hardware, software or combination of hardware and software, and be integrated into at least one module for at least one processor.

In the disclosure, a term at least one among a plurality of elements is used to refer not only all the plurality of elements but also each individual one excluding the rest of the plurality of elements or all combinations thereof.

In the accompanying drawings, 'X', 'Y' and 'Z' indicate three directions orthogonal to one another in a space. The opposite directions to 'X', 'Y' and 'Z' are represented with '−X', −Y' and '−Z', respectively. In the following embodiments, for convenience of description, the direction of 'X' may represent a frontward direction of the air conditioner (see '100' in FIG. 1), and the direction of '−X' may represent a backward direction of the air conditioner 100. Further, when a plane is parallel with two axes among the axes of three directions, the other one axis is in a direction normal to the plane. For example, the direction of 'X' is normal to the plane of 'Y-Z'.

FIG. 1 shows a perspective view of an outer appearance of an air conditioner according to an embodiment of the disclosure. The air conditioner 100 to which the concept of the disclosure is applied may be embodied by various kinds of apparatuses such as an air cleaner, a dehumidifier, an air cooler, etc. As shown in FIG. 1, an air conditioner 100 according to an embodiment of the disclosure may include a cover 110 of which an outer appearance is generally shaped like a cube and edge and vertexes are rounded. Air is introduced into the air conditioner 100 through the back of the air conditioner 100, dust or gas is filtered out of the air introduced into the air conditioner 100, and air inside the air conditioner 100 is discharged to the outside through the front of the air conditioner 100.

The back and front of the air conditioner 100 are formed with openings, respectively. The opening (see '221' in FIG. 2) in the back of the air conditioner 100 is used as an inlet through which external air is introduced into the air conditioner 100. From the front of the air conditioner 100, air inside the air conditioner 100 is discharged to the outside. The left and right sides of a cover 110 may have holes (see '720' in FIG. 7) for introducing air. The air conditioner 100 may include a front panel 120 in the front thereof.

The front panel 120 may include a user interface (UI) 121 provided in a predetermined first area on the surface thereof, allowing a user to make a user input, and displaying the state of the air conditioner 100, and a plurality of punching holes or through holes formed on a second area other than the first area. Through the through holes, the filtered air may be discharged to the outside in the direction of 'X'. According to the disclosure, there are no limits to the plurality of punching holes or through holes in the front panel 120. Alternatively, air inside the air conditioner 100 may be discharged to the outside through other structures different from those of the foregoing description. For example, air inside the air conditioner 100 may be discharged to the outside through a vent (see '211' in FIG. 2) between the front panel 120 and a housing (see '340' in FIG. 3).

Figure 2:
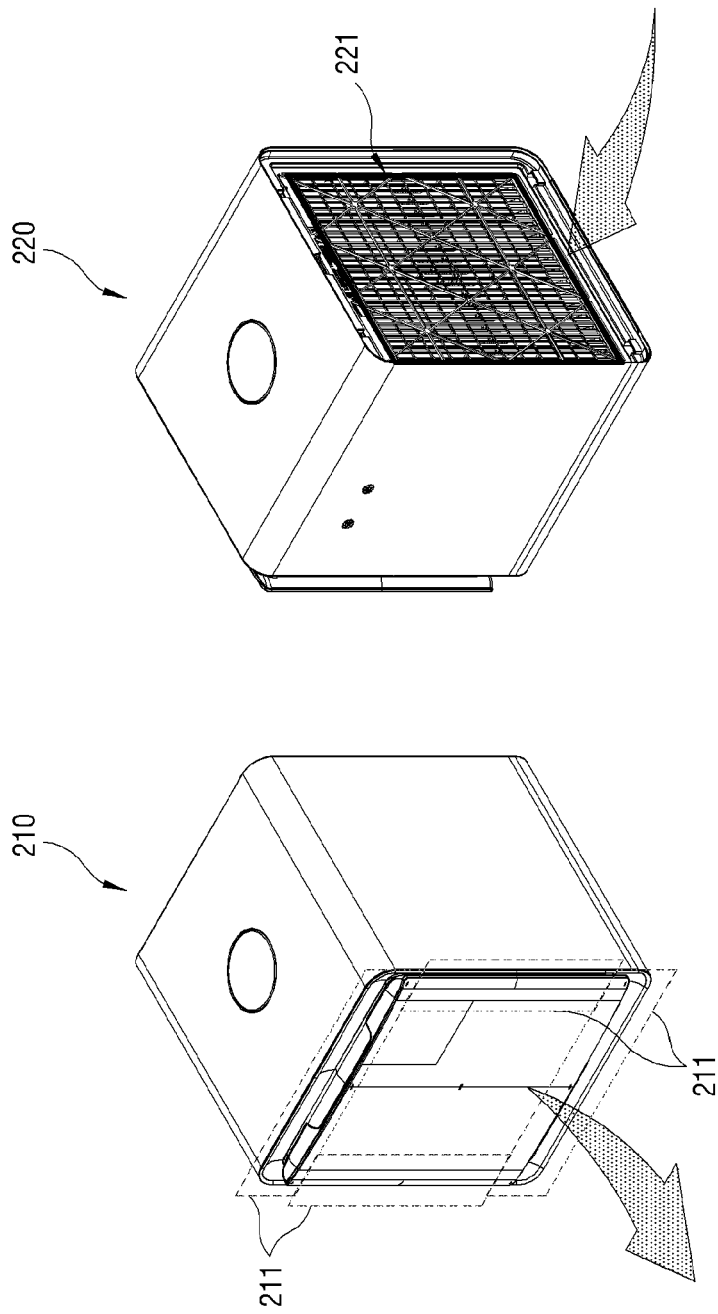
FIG. 2 shows a perspective view of an outer appearance of an air conditioner of according to an embodiment of the disclosure.

FIG. 2 shows a perspective view of an outer appearance of an air conditioner of according to an embodiment of the disclosure. As shown in FIG. 2, the air conditioner 100 introduces air in the X-axial direction through a back opening 221 (see '220'). The air conditioner 100 discharges the air introduced through the back opening 221 in the X-axial direction through the front panel 120 or the vent 211 via the inside of the housing 340 (see '210').

Further, the front panel 120 is movable. For example, the front panel 120 is movable from the housing 340 in the X or −X axial direction. As the front panel 120 is moved, the vent 211 between the front panel 120 and the housing 340 may be changed in size. Alternatively, a shield (not shown) may be provided to open and close the vent 211, and control air discharged through the vent 211. By moving the front panel 120 or opening/closing the vent 211, it is possible to control speed or volume of air discharged from the air conditioner 100.

Figure 3:
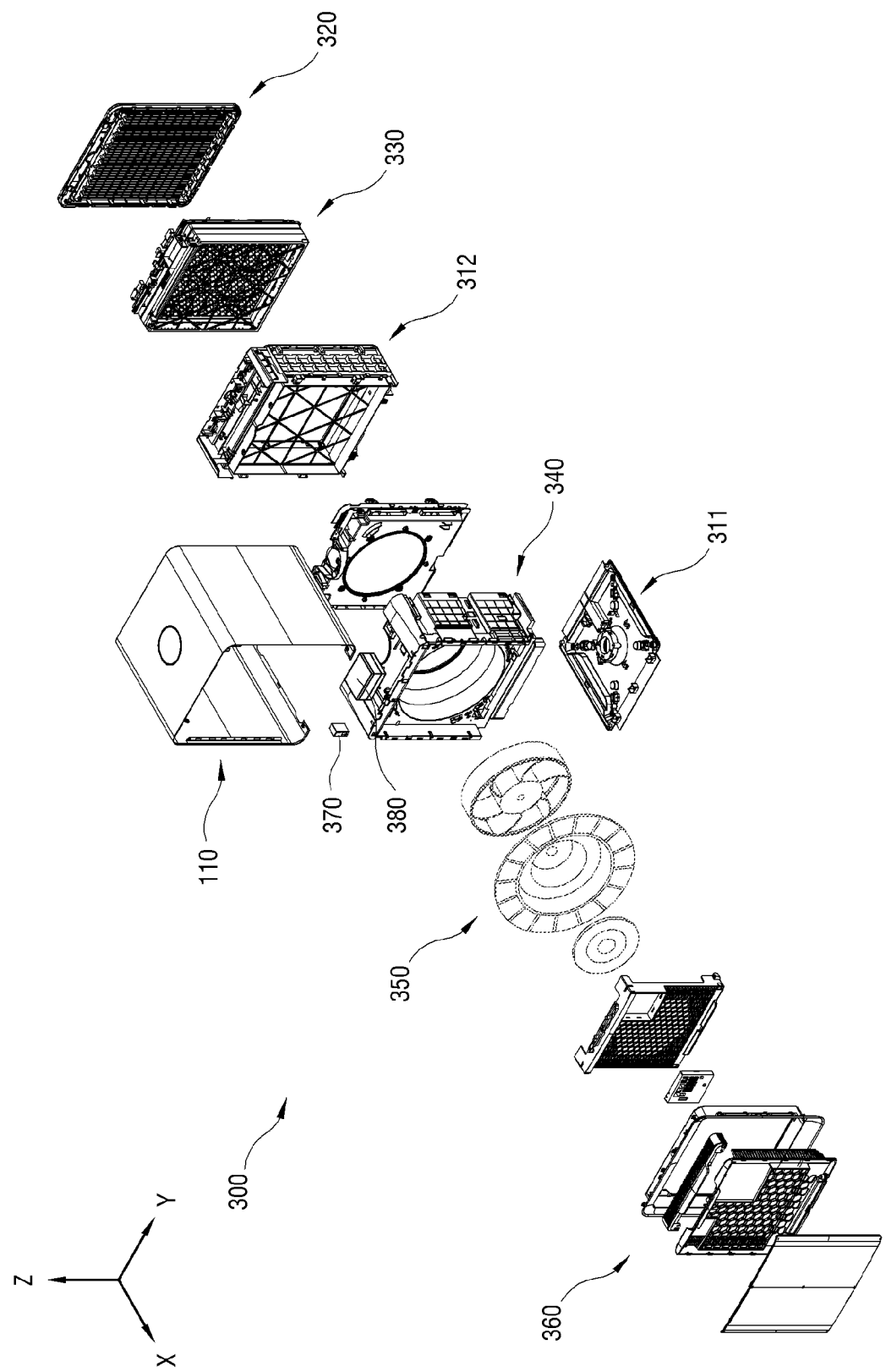
FIG. 3 shows an exploded perspective view of an internal structure of an air conditioner according to an embodiment of the disclosure.

FIG. 3 shows an exploded perspective view of an internal structure of an air conditioner according to an embodiment of the disclosure. As shown in FIG. 3, the internal structure of the air conditioner 100 according to an embodiment of the disclosure will be described.

The air conditioner 100 according to an embodiment of the disclosure includes the cover 110 forming an outer appearance and formed with the openings in the front and back thereof, a rear panel unit 320 provided in the back opening 221 of the air conditioner 100, a filter unit 330 positioned inside the cover 110 and filtering air introduced through the rear panel unit 320, a housing 340, an air-blowing unit 350 including a fan driver to move air, a front panel unit 360 provided in the vicinity of the front opening of the air conditioner 100, a sensor 370 capable of detecting foreign materials (hereinafter, referred to as 'dust') in air, and a control unit 380 controlling general operations of the air conditioner 100.

The air conditioner 100 according to an embodiment of the disclosure may include various elements in addition to such elements.

The housing 340 may be coupled onto a base 311 put on the floor, and coupled to the cover 110. The edges of the cover 110 are rounded for convenience of a user. The cover 110 is internally provided with a housing 340 and a frame 312 to which general elements of the air conditioner 100 are coupled or supported. The cover 110 may include holes (see '720' in FIG. 7). Details of the holes will be described with reference to FIG. 7.

The rear panel unit 320 includes a plate for covering the back inlet of the air conditioner 100, and the plate may include at least one through hole. The rear panel unit 320 is coupled to the frame 312 or the cover 110, thereby covering the back inlet to protect the inside of the air conditioner 100. Air outside the air conditioner 100 is introduced into the air conditioner 100 through the through holes of the rear panel unit 320. A plurality of through holes are uniformly distributed and arranged throughout the surface of the rear panel unit 320, thereby uniformly introducing external air.

The filter unit 330 includes one or more filters, of which surfaces are arranged perpendicularly to the X-axial direction. When the filter unit 330 includes a plurality of filters, the plurality of filters are arranged in sequence along the X-axial direction, so that air moving in the X-axial direction can pass through the filters. Each filter of the filter unit 330 includes a filter member for purifying air by interaction with the air, and a filter frame supporting the filter member. The kinds of filters in the filter unit 330 depend on the characteristics of the filter member, and the filter unit 330 may be designed to include a plurality of filters different in characteristics from each other.

The filter of the filter unit 330 serves to collect dust from air, remove bad smells, purify gas, perform sterilization, etc. For example, the filter unit 330 may include at least one of a prefilter of which lattices are comparatively large to filter out dust of relatively big particles, a dust-collection filter to collect fine dust, a deodorant filter provided with granular activated carbon or the like to remove bad smells, and a sterilization filter provided with an active oxygen layer or the like for sterilization. Details of the filter will be described with reference to FIG. 8.

Each individual filter of the filter unit 330 is separable from the housing 340 or the frame 312, and it is thus possible to individually replace or clean the filters.

The housing 340 guides the introduced air to move forward from the housing 340 by the air-blowing unit 350. The housing 340 is provided in front of the filter unit 330 within the air conditioner 100, and guides purified air passed through the filter unit 330 to the outlet in the front of the housing 340. The air-blowing unit 350 is provided in front of the housing 340, and the inside of the housing 340 is shaped like a circle corresponding to the outer shape of the air-blowing unit 350.

The air-blowing unit 350 includes a motor, and an air-blowing fan which is driven by the motor to revolve based on a predetermined number of revolution times per unit time and form airflow. The air-blowing unit 350 is provided in front of the housing 340, sucks air outside the air conditioner 100 into the air conditioner 100, and moves air purified passing through the filter unit 330 toward the outlet provided in the front of the housing 340. The air-blowing unit 350 may send air in various directions according to the structures of the air-blowing fan. According to this embodiment, the air-blowing unit 350 is provided to move the air in the direction of 'X'. Further, the air-blowing unit 350 is provided to stop and operate the fan and to change the operating speed of the fan under control of the control unit 380. A processor (see '410' in FIG. 4) may calculate information about air volume based on operating speed.

The front panel unit 360 covers the outlet in the front of the housing 340. The front panel unit 360 includes a front panel, a channel guide provided on the rear surface of the front panel, and a grill plate provided behind the front panel.

The control unit 380 may include a circuit on a printed circuit board (PCB) with electronic parts such as a chipset, a processor, a control processing unit (CPU), a memory, etc. The processor (see '410' in FIG. 4) is provided on the housing 340 or the frame 312 of the air conditioner 100, and transmits a control signal to the air-blowing unit 350, the front panel unit 360, and the like elements which need driving control. Below, a driving control method of the processor will be described in detail.

Figure 4:
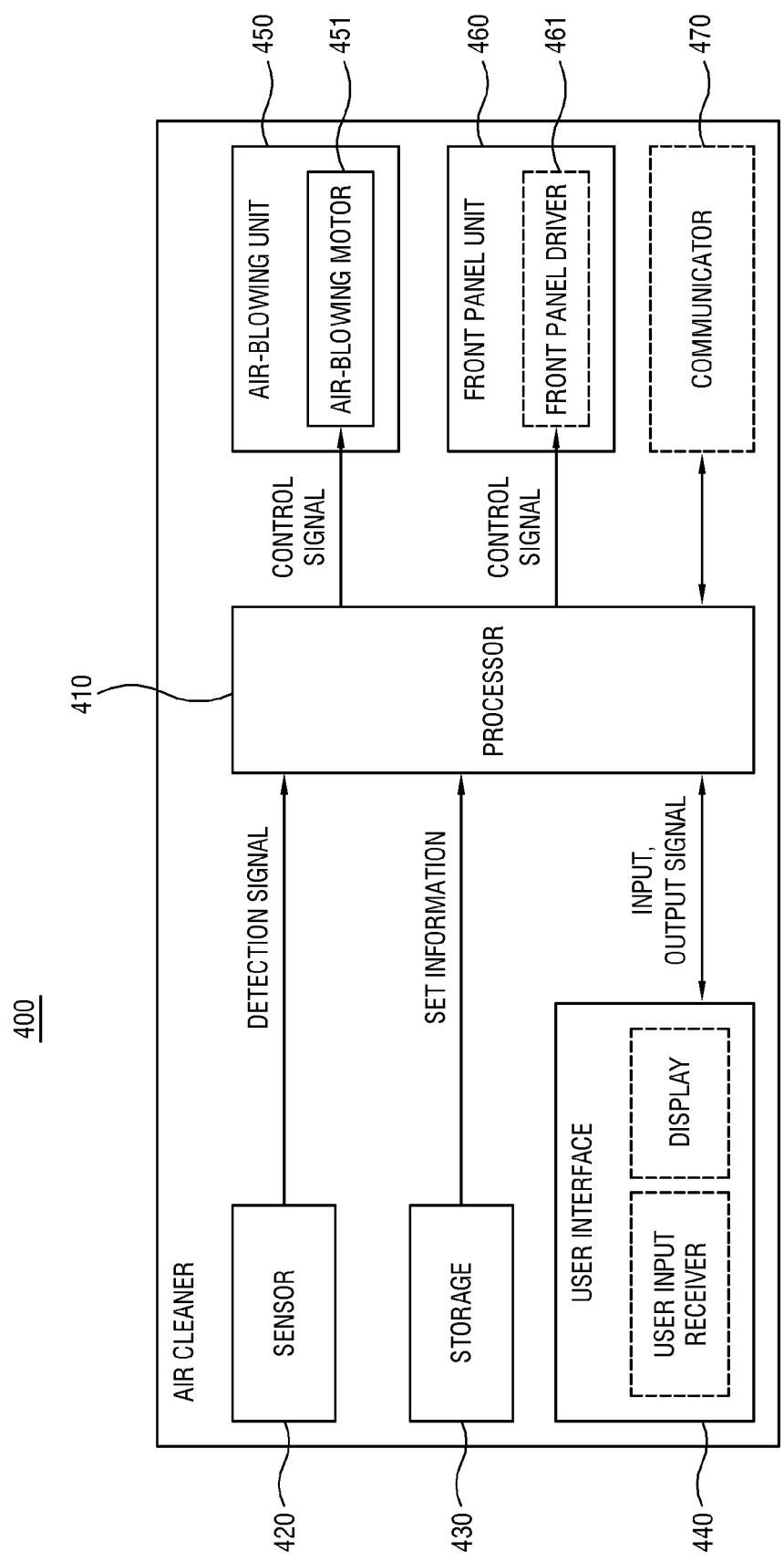
FIG. 4 shows a block diagram of a control structure of an air conditioner according to an embodiment of the disclosure.

FIG. 4 shows a block diagram of a control structure of an air conditioner according to an embodiment of the disclosure. As shown in FIG. 4, the air conditioner 100 according to an embodiment of the disclosure includes a sensor 420, a storage 430, a user interface 440, an air-blowing unit 450, and a front panel unit 460. However, the configuration of the air conditioner 100 shown is merely an example, and the air conditioner 100 according to an alternative embodiment of the disclosure may be achieved by other configurations than the configuration shown in FIG. 4. That is, the air conditioner 100 according to an embodiment of the disclosure may include another element in addition to the configuration shown in FIG. 4, or exclude a certain element from the configuration shown in FIG. 2.

The sensor 420 detects foreign materials in air. Based on information about the foreign materials detected by the sensor 420, the processor 410 may identify mass concentration of foreign materials in air. The sensor 420 may use an optical method based on a laser, visible light, etc. To detect foreign materials in air introduced into the air conditioner 100, the sensor 420 may be positioned inside a channel for air. Alternatively, the sensor 420 may be positioned in a space isolated from the channel. There are no limits to the position and number of sensor 420. The sensor 420 may be positioned in another space, and one or more sensors may be present. The sensor 420 may detect various foreign materials in air. The sensor 420 may for example detect fine dust (PM10) having a diameter smaller than 10 μm, ultrafine dust (PM2.5) having a diameter smaller than 2.5 μm, etc. according to the sizes of foreign materials, or may also detect various smelling particles and the like chemical substances, metallic substances, etc. according to compositions of foreign material. The sensor 420 may for example emit a laser and detect the laser reflected from the foreign material, thereby obtaining detection information. The detection information means a scattering level of a reflected laser. The processor 410 may identify the mass concentration of the foreign material by receiving the detection information from the sensor 420. The higher the scattering level of the reflected laser, the higher the mass concentration of the foreign material. The lower the scattering level of the reflected laser, the lower the mass concentration of the foreign material. A correlation between the scattering level and the mass concentration of the foreign material may be based on experimental values and stored in the storage 430. The mass concentration of the foreign material based on the experimental values may be stored in units of $mg/m^3$ or $\mu g/m^3$ The sensor 420 may obtain the detection information based on the kinds of foreign materials or may obtain the detection information based on a total amount of foreign materials. The processor 410 may output the identified mass concentration of the foreign material through a display or a loudspeaker (not shown) of the user interface 440 (to be described later). A procedure of obtaining accumulated dust quantity will be described with reference to FIG. 8.

The storage 430 may be configured to store various pieces of information under control of the processor 410, or may be configured to store information received from the outside through a communicator 470. The information stored in the storage 430 may for example include information about a correlation between the mass concentration of foreign materials in air and the life of the filter, information about accumulated use time of driving the fan, etc.

The user interface 440 may receive a user input and output an image or voice. The air conditioner 100 may directly receive a user's control, voice and the like user input through the user interface 440. For example, the user interface 440 may include a touch screen with a display, a button, a microphone, etc. Alternatively, the air conditioner 100 may indirectly receive a user input through the communicator 470 or the like. For example, the air conditioner 100 may receive a digital signal, which is converted from a user input received through a button of a remote controller, a microphone of a remote controller, etc., through the communicator 470 or the like. The user interface 440 may inform a user of a specific state of the air conditioner 100 through the display or the loudspeaker (not shown).

The air-blowing unit 450 controls operation of an air-blowing motor 451 under control of the processor 410. The processor 410 may adjust the number of revolution times of the air-blowing motor 451 per unit time. The processor 410 may control the air volume introduced into the air conditioner 100 by adjusting the number of revolution times of the air-blowing motor 451 per unit time.

The panel unit 460 controls operation of a front panel driver 461 under control of the processor 410. Further, the panel unit 460 may include a user interface 121 on which the user input and the state of the air conditioner 100 are displayed. The user interface 121 may receive a user's input, and give visual or acoustic information to the user.

The communicator 470 may perform communication with an external apparatus (not shown) under control of the processor 410. The communicator 470 may be based on one of various communication methods. For example, the communicator 470 includes a connector for wired communication, and the connector transmits/receives a signal/data based on high definition multimedia interface (HDMI), HDMI-consumer electronics control (CEC), a universal serial bus (USB) component, and the like standards and includes at least one port or terminal corresponding to these standards. The communicator 470 may performed the wired communication with a plurality of servers through a wired local area network (LAN).

The communicator 470 may be based on various communication methods different from the connector for the wired connection. For example, the communicator 470 may include a radio frequency (RF) circuit for transmitting/receiving an RF signal to perform wireless communication with the external apparatus, and be based on at least one communication method among Wi-Fi, Bluetooth, Zigbee, ultra-wide band (UWB), wireless USB, near field communication (NFC), and Infrared data association (IrDA).

The processor 410 performs control for operating general elements of the air conditioner 100. The processor 410 may include a control program (or instruction) for carrying out the foregoing control operation, a nonvolatile memory in which the control program is installed, a volatile memory to which at least a part of the installed control program is loaded, and at least one processor or central processing unit (CPU) for executing the loaded control program. Further, such a control program may be stored in other electronic apparatuses as well as the air conditioner 100.

The control program may include a program(s) achieved in the form of at least one of a basis input/output system (BIOS), a device driver, an operating system, firmware, a platform, and an application program. According to an embodiment, the application program may be previously installed or stored in the air conditioner 100 when the air conditioner 100 is manufactured, or may be installed in the air conditioner 100 based on application program data received from the outside when needed in the future. The application program data may for example be downloaded from an application market or the like external server to the air conditioner 100. Alternatively, the application program data may also be copied or moved to the air conditioner 100 by a USB storage device or the like. Such an external server or USB storage device is an example of a computer program product of the disclosure, but not limited to this example.

Figure 5:
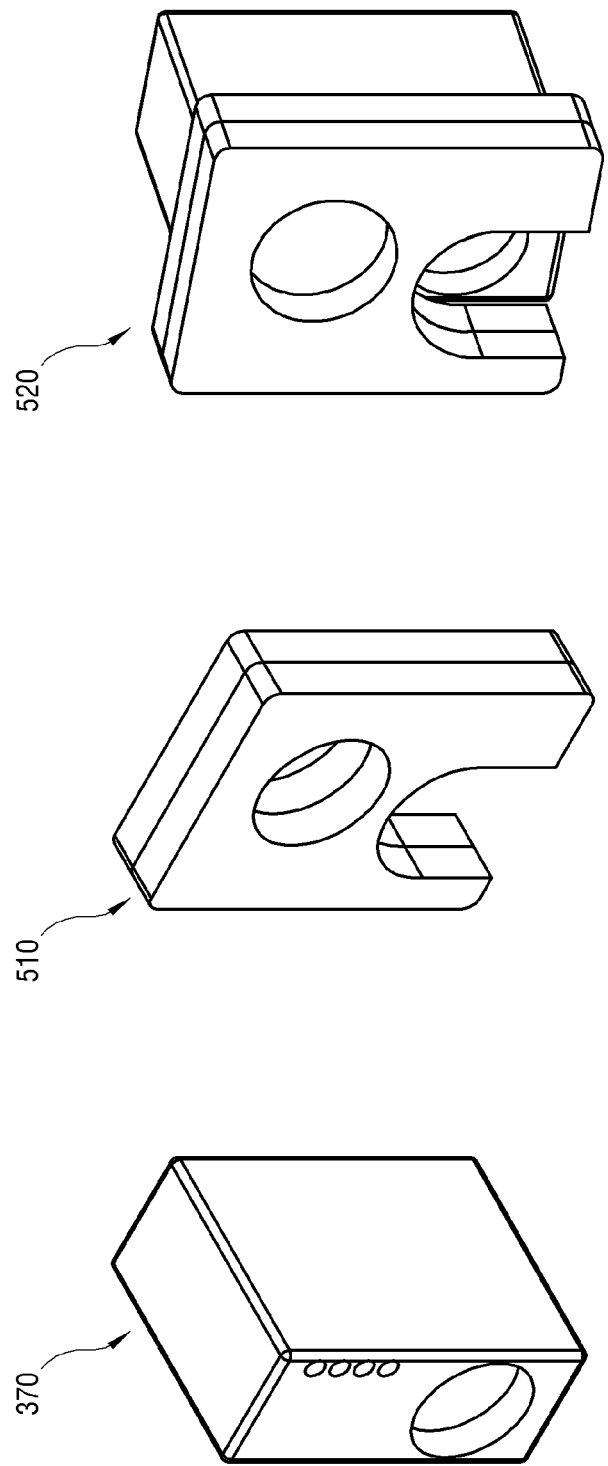
FIG. 5 shows a perspective view of a sensor of an air conditioner according to an embodiment of the disclosure.

FIG. 5 shows a perspective view of a sensor of an air conditioner according to an embodiment of the disclosure. To protect the sensor 370, a guard 510 may be provided in the vicinity of a light emitter and a light receiver of the sensor 370. The guard 510 may be positioned between the sensor 370 and the cover 110. The guard 510 may be formed with at least one hole through which air passes, and has a stacked structure. The hole of the guard 510 shown in FIG. 5 may have various shapes such as a circular shape, a trigonal shape, a tetragonal shape, etc. The guard 510 may include a mesh or net to filter out some foreign materials in introduced air. Some foreign materials filtered out by the guard 510 may include relatively large foreign materials.

Thus, the guard 510 prevents foreign materials in air outside the air conditioner 100, which is introduced through a hole (see '720' in FIG. 7) of the housing 110, from being accumulated in a detection area such as the light emitter and the light receiver of the sensor 370. The cover 710 is not limited to the example described above, and refers to a structure capable of preventing dust from accumulating and settling on the sensor 370. The sensor 370 and the guard 510 may be in close contact with each other (see '520'). When the guard 510 is in close contact with the sensor 370, the hole of the guard 510 is aligned with the light emitter and the light receiver of the sensor 370, thereby allowing the sensor 370 to detect information about foreign materials.

Figure 6:
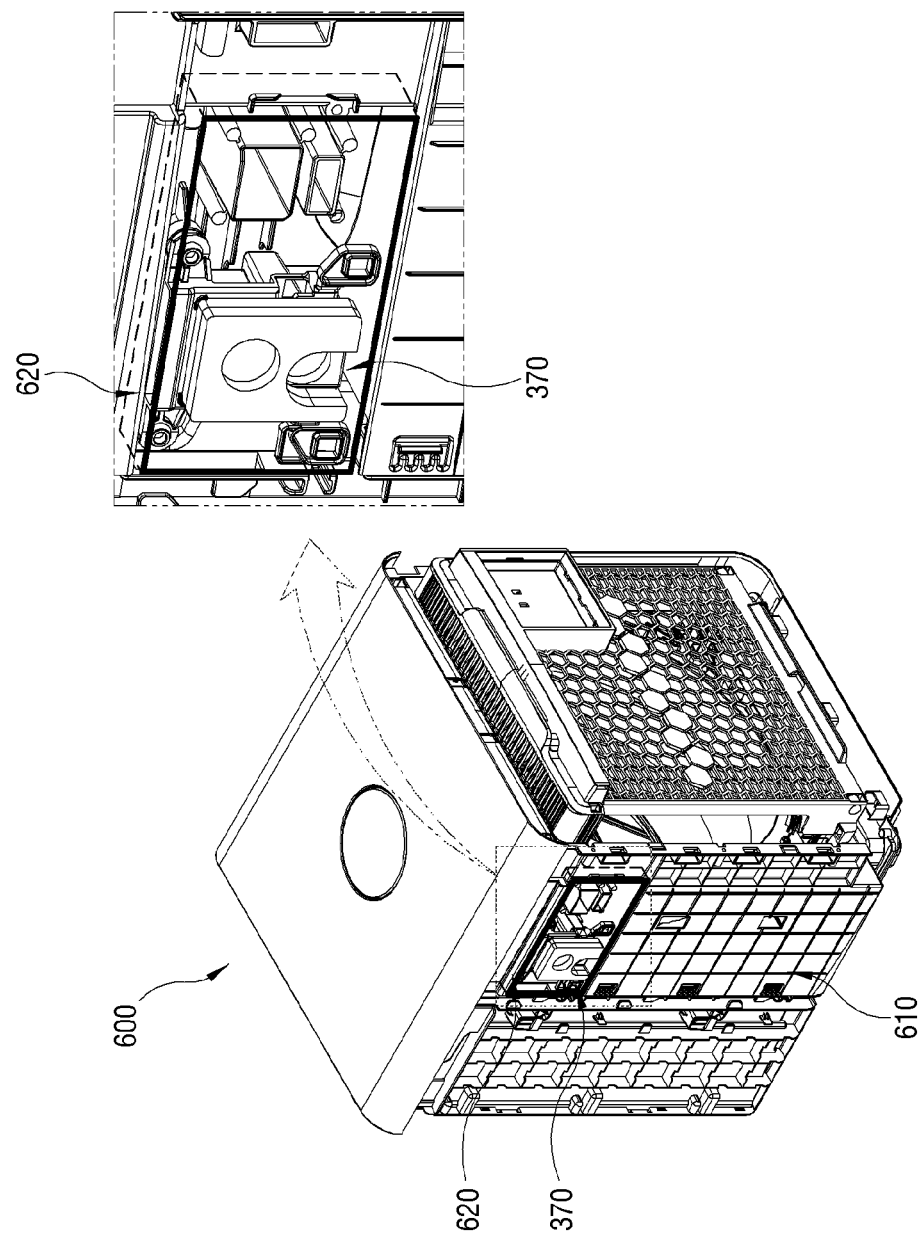
FIG. 6 shows a perspective view of a partial structure of an air conditioner according to an embodiment of the disclosure.

FIG. 6 shows a perspective view of a partial structure of an air conditioner according to an embodiment of the disclosure. As shown in FIG. 6, the sensor 370 is positioned inside a housing 610 of the air conditioner 100 (see '600'). The housing 610 may include a sensor room 620 opened outward and having an internal accommodating space, and the sensor 370 may be provided in the sensor room 620. The sensor 370 may be positioned inside the air conditioner 100 and detect foreign materials in air introduced into the air conditioner 100.

The sensor 370 positioned at a lateral side of the air conditioner 100 is given as an exemplary embodiment, and the disclosure is not limited to this embodiment. Therefore, the sensor 370 provided inside the sensor room 620 is merely one of the embodiments, and the sensor 370 may be positioned not in the sensor room 620 but inside or outside the channel in the housing 610 or on an outer side of the cover 110. When the sensor 370 is provided inside the channel in the housing 610, the sensor 370 may for example be positioned in the rear panel unit 320, the filter unit 330, or the housing 610 based on flow of air introduced into the air conditioner 100. The sensor 370 may be positioned in a space which is ahead of filtering the introduced air by the filter unit 330. In other words, the sensor 370 may be provided at a position in which the mass concentration of the foreign material in the detecting space is the same or similar to the mass concentration of the foreign material in a space at an air introducing side of the filter unit 330. Alternatively, the sensors 370 may be respectively positioned in the inlet and the outlet and detect the mass concentration of the foreign material before and after foreign materials in air are filtered out by the filter. The processor 410 may calculate the remaining life of the filter by accurately measuring the mass concentration of the foreign material.

Figure 7:
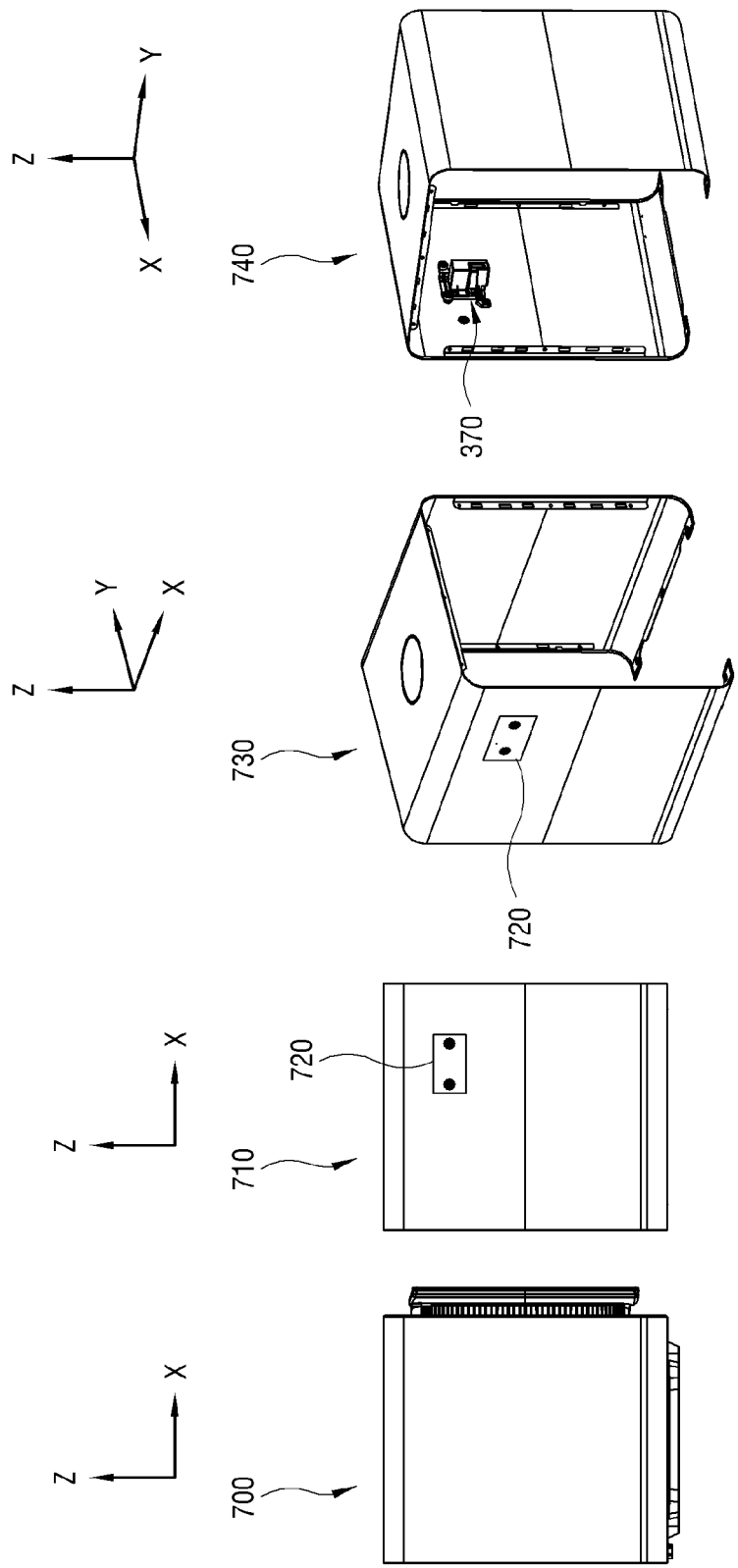
FIG. 7 shows a lateral view and a perspective view of an outer appearance of an air conditioner and a housing according to an embodiment of the disclosure.

FIG. 7 shows a lateral view and a perspective view of an outer appearance of an air conditioner and a housing according to an embodiment of the disclosure. FIG. 7 illustrates the air conditioner 100 and the cover 110 on the X-Z plane viewed in the Y-axial direction (see '700' and '710) and the outer appearance of the cover 110 (see '730' and '740').

The cover 110 includes holes on a lateral side thereof so that air can flow in and out through the holes (see '710' and '730'). Referring to '710', holes 720 are positioned on the cover 110 in the −Y-axial direction. However, there are no limits to the position of the hole 720. Alternatively, the cover 110 may have holes 720 in the vicinity of the sensor 370. There may be one or more holes 720. Further, when there is a plurality of holes 720, the plurality of holes 720 may be positioned close to each other (see '710'), but may be positioned far away from each other.

Figure 8:
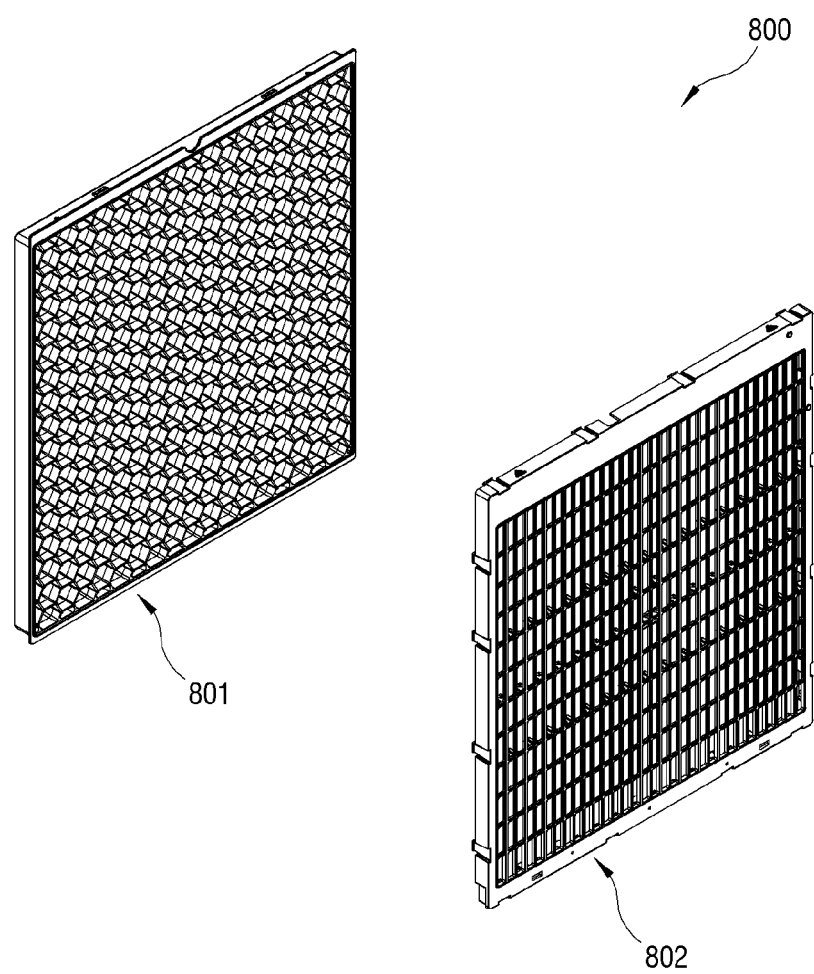
FIG. 8 shows a filter of an air conditioner according to an embodiment of the disclosure.

FIG. 8 shows a filter of an air conditioner according to an embodiment of the disclosure. The filter may filter out foreign materials in air. There are various kinds of foreign materials in air, and therefore various kinds of filters may be used for filtering out the foreign materials. There are a filter using fiber to filter out the foreign materials in air, a filter using static electricity to filter out the foreign materials in air, a filter using chemicals to filter out the foreign materials in air, a filter using photocatalysis to filter out the foreign materials in air, etc. The filter unit (see '330' in FIG. 3) may include a plurality of filters. Filter supporters 801 and 802 for supporting the filters at stationary positions may be provided as parts of the filter unit 330. The shape of the filter supporters 801 and 802 is not limited to the tetragonal shape, and may vary depending on the internal structure of the air conditioner 100.

The processor 410 may use the detection information to obtain the quantity of dust accumulated on the filter. The processor 410 may use the detection information of the sensor 420 to obtain the quantity (mg/s) of dust filtered per second by multiplying the mass concentration (mg/m$^3$) of the dust and the air volume (m$^3$/s). The processor 410 can obtain the quantity of dust (mg) accumulated on the filter by multiplying the quantity (mg/s) of dust filtered per second and the operation time (s) of the air conditioner 100. The quantity of accumulated dust is obtained by the following expression.

[Expression]

The accumulated dust quantity=the mass concentration of dust*the air volume*the operation time When the accumulated dust quantity exceeds the accumulation limit of the filter, and there is a need of replacing the filter, the processor 410 may output an image or a voice through the user interface 440 to inform a user that the filter needs to be replaced. Further, the processor 410 may initialize the use time of the filter automatically or in response to a user input made through the user interface 440. Thus, the processor 410 may initialize the use time of the filter after replacing the filter, and thus accurately identify the performance of the replaced filter.

Figure 9:
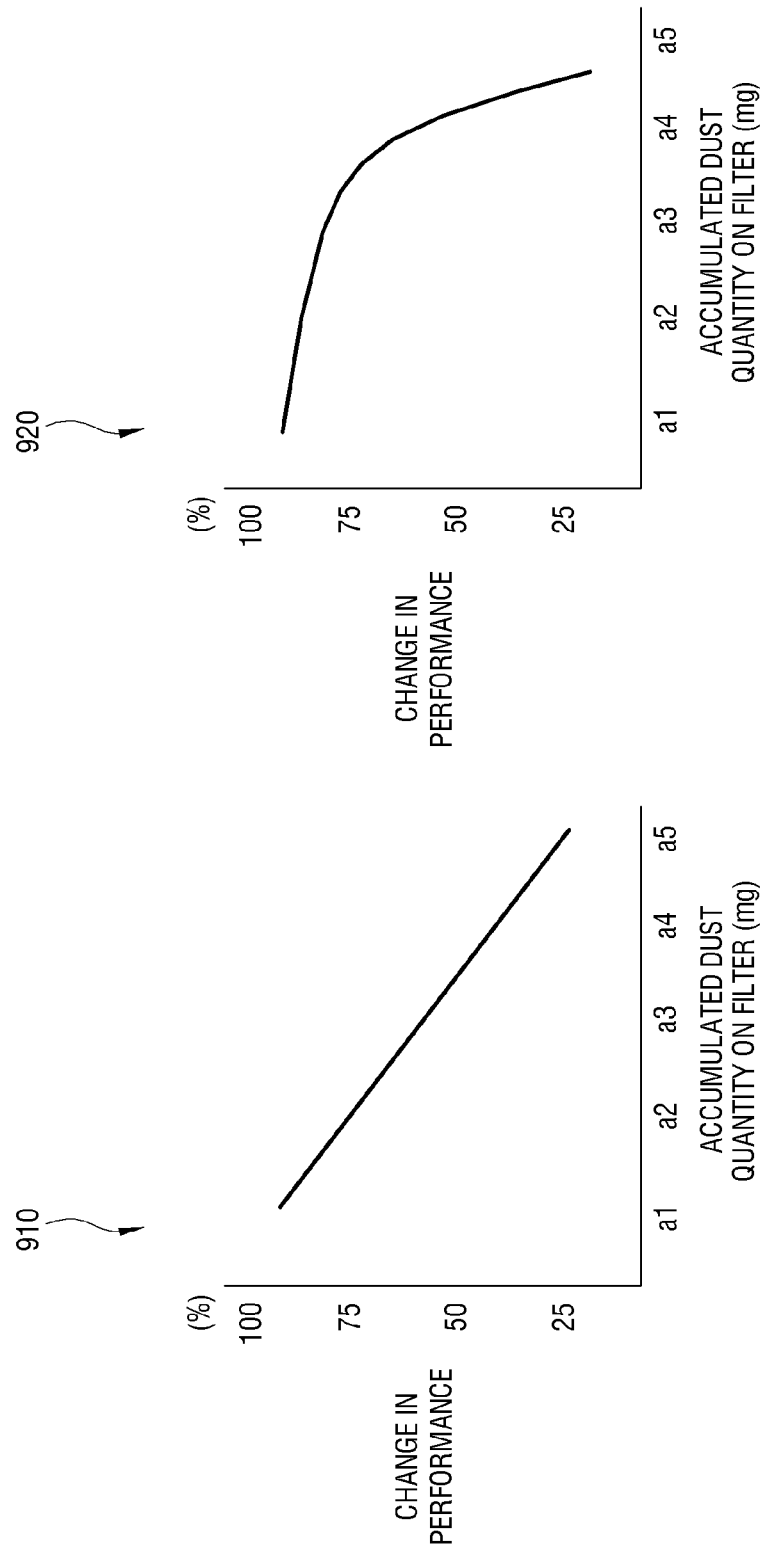
FIG. 9 shows performance of an air conditioner according to an embodiment of the disclosure.

FIG. 9 shows performance of an air conditioner according to an embodiment of the disclosure. FIG. 9 is a graph showing a correlation between the performance of the air conditioner 100 and the accumulated dust quantity. The performance of the air conditioner 100 may be linearly decreased (see '910') as the quantity of dust accumulated on the filter of the air conditioner 100 increases. Besides, the performance of the air conditioner 100 may be nonlinearly decreased (see '920') as the quantity of dust accumulated on the filter of the air conditioner 100 increases (see '920'). The correlation between the accumulated dust quantity and the performance of the air conditioner 100 may vary depending on the filters of the air conditioner 100, use environments, the kinds of foreign materials in air, etc. For example, the air conditioner 100 with accumulated fine dust of 10 mg and the air conditioner 100 with accumulated ultrafine dust of 10 mg may be different in performance.

The performance of the air conditioner 100 may vary depending on the air volume and a dust filtering degree of the filter. Below, change in air volume according to how much the air conditioner 100 is used will be described. The amount of foreign materials accumulated on the filter becomes larger the more the air conditioner 100 is used, and resistance against the large amount of foreign materials may cause the air volume discharged to the outside (hereinafter, referred to as 'actual air volume') to be decreased even though set air volume is not changed. For example, when the air volume is set to 1 m$^3$/s, the actual air volume passing through the filter having a 100% remaining life is 1 m$^3$/s but the actual air volume passing through the filter having a 10% remaining life is 0.7 m$^3$/s. In other words, the actual air volume introduced into the air conditioner 100 may be less than the set air volume because the dust quantity accumulated on the filter increases the more the air conditioner 100 is used.

Below, it will be described that a filtering level is changed the more the air conditioner 100 is used. When the amount of foreign materials accumulated on the filter increases under a condition that the actual air volume is constant, dust accumulated on the filter serves as a filter and thus improves the performance of the filter. When the actual air volume is constant at 1 $m^3/s$, the amount of foreign materials filtered out by the filter having a 50% remaining life may be more than the amount of foreign materials filtered out by the filter having a remaining life of 100%.

In result, the performance of the filter may be more improved the more the air conditioner 100 is used, but the performance of the air conditioner 100 becomes lower as the actual air volume decreases.

Based on experiments, it is possible to calculate difference values between the set air volume and the actual air volume and change values in the performance of the filter according to how much the air conditioner 100 is used. The difference and change values obtained based on the experiments are stored in the storage 430, and the processor 410 compensates for the difference and change values and accurately identifies the dust quantity accumulated on the filter to calculate the remaining life of the filter. For example, when the accumulated dust quantity increases and the actual air volume is about 30% lower than the set air volume, the processor 410 may identify 70% of the set air volume as the actual air volume. Therefore, the processor 410 may compensate for the air volume based on at least one of the use time and the accumulated dust quantity.

FIG. 10 shows values set in an air conditioner according to an embodiment of the disclosure. The performance of the filter is related to time from the time to replace the filter, the use time of the air conditioner 100, or the amount of accumulated foreign materials. The longer the use time of the air conditioner 100, the lower the performance of the filter. Further, when the amount of foreign materials accumulated on the filter increases the more the air conditioner 100 is used, the performance of the filter may be lowered. The change in the performance of the filter may be different according to the kinds of filters, the use environments of the air conditioner 100, and the kinds of foreign materials in air. Factors related to the change in the performance of the filter are not limited to those described above, and may include other factors.

The mass concentration of foreign materials in air may be identified by the processor 410 based on the detection information of the sensor 370. The air volume may be obtained by experiments in the corresponding air conditioner, and then stored as information corresponding to experimental values in the storage 430. The air volume may be different according to use environments, and therefore information about air volumes suitable for the use environments may be stored in the storage 430. The processor 410 may store the operation time of the air-blowing motor 451 in the storage 430 and thus obtain the use time.

Based on the information stored in the storage 430, the processor 410 may obtain the use time and the accumulated dust quantity. Below, a relationship between the accumulated dust quantity and the performance of the filter will be described.

The use time and the dust-measured value may be divided into a total of four levels. In the following description, for convenience of description, a %-point interval of each level among the four levels has a 25%-point. The four levels are merely resulted from arbitrarily dividing the use time and the dust-measured value, and the number of levels may be designed to increase or decrease. Further, the %-point corresponding to each level may be different. For example, when three levels are designed, the %-point corresponding to each level may a 30%-point. When five levels are designed, the %-point corresponding to each level may a 20%-point. The processor 410 may output the time and dust levels of the air conditioner 100 to the display of the user interface 440 or another output unit. Thus, a user can grasp time to replace the filter of the air conditioner 100.

Below, the factor of the dust-measured value will be described (see '1000').

The filters may be different in a limit value 'D' mg of allowable dust quantity, and the limit value of the dust quantity may have been stored in the storage 430 based on information corresponding to experimental values. Therefore, values of 'A', 'B' and 'C' correspond to 25%, 50% and 75% of 'D', respectively. For example, when 'D' is 100,000, 'A' is 25,000; 'B' is 50,000; and 'C' is 75,000.

A first dust level refers to a case where the quantity of dust accumulated on the filter since the replacement of the filter is more than or equal to 'A' mg. When it is measured that the accumulated dust quantity is less than 'A' mg, the processor 410 may identify that the filter shows 100% performance. When it is measured that the accumulated dust quantity is more than 'A' mg, the processor 410 may identify that the current dust level is the first dust level and identify that the filter has a 75% remaining life.

A second dust level refers to a case where the quantity of dust accumulated on the filter since the replacement of the filter is more than or equal to 'B' mg. 'B' mg is a value corresponding to about ²⁄₄ of the dust-quantity limit value allowable by the filter, and the value of 'B' may be varied depending on the kinds of filters. When it is measured that the accumulated dust quantity is less than 'B' mg, the processor 410 may identify that the filter shows 75% performance. When it is measured that the accumulated dust quantity is more than 'B' mg, the processor 410 may identify that the current dust level is the second dust level and identify that the filter has a 50% remaining life.

A third dust level refers to a case where the quantity of dust accumulated on the filter since the replacement of the filter is more than or equal to 'C' mg. 'C' mg is a value corresponding to about ¾ of the dust-quantity limit value allowable by the filter, and the value of 'C' may be varied depending on the kinds of filters. When it is measured that the accumulated dust quantity is less than 'C' mg, the processor 410 may identify that the filter shows 50% performance. When it is measured that the accumulated dust quantity is more than 'C' mg, the processor 410 may identify that the current dust level is the third dust level and identify that the filter has a 25% remaining life.

A fourth dust level refers to a case where the quantity of dust accumulated on the filter since the replacement of the filter is more than or equal to 'D' mg. 'D' mg is a value corresponding to about 4/4 of the dust-quantity limit value allowable by the filter, and the value of 'D' may be varied depending on the kinds of filters. When it is measured that the accumulated dust quantity is less than 'D' mg, the processor 410 may identify that the filter shows 25% performance. When it is measured that the accumulated dust quantity is more than 'D' mg, the processor 410 may identify that the current dust level is the fourth dust level and identify that the filter has a 0% remaining life. Below, descriptions will be made with reference to FIG. 11 under the conditions described with reference to FIG. 10.

Figure 11:
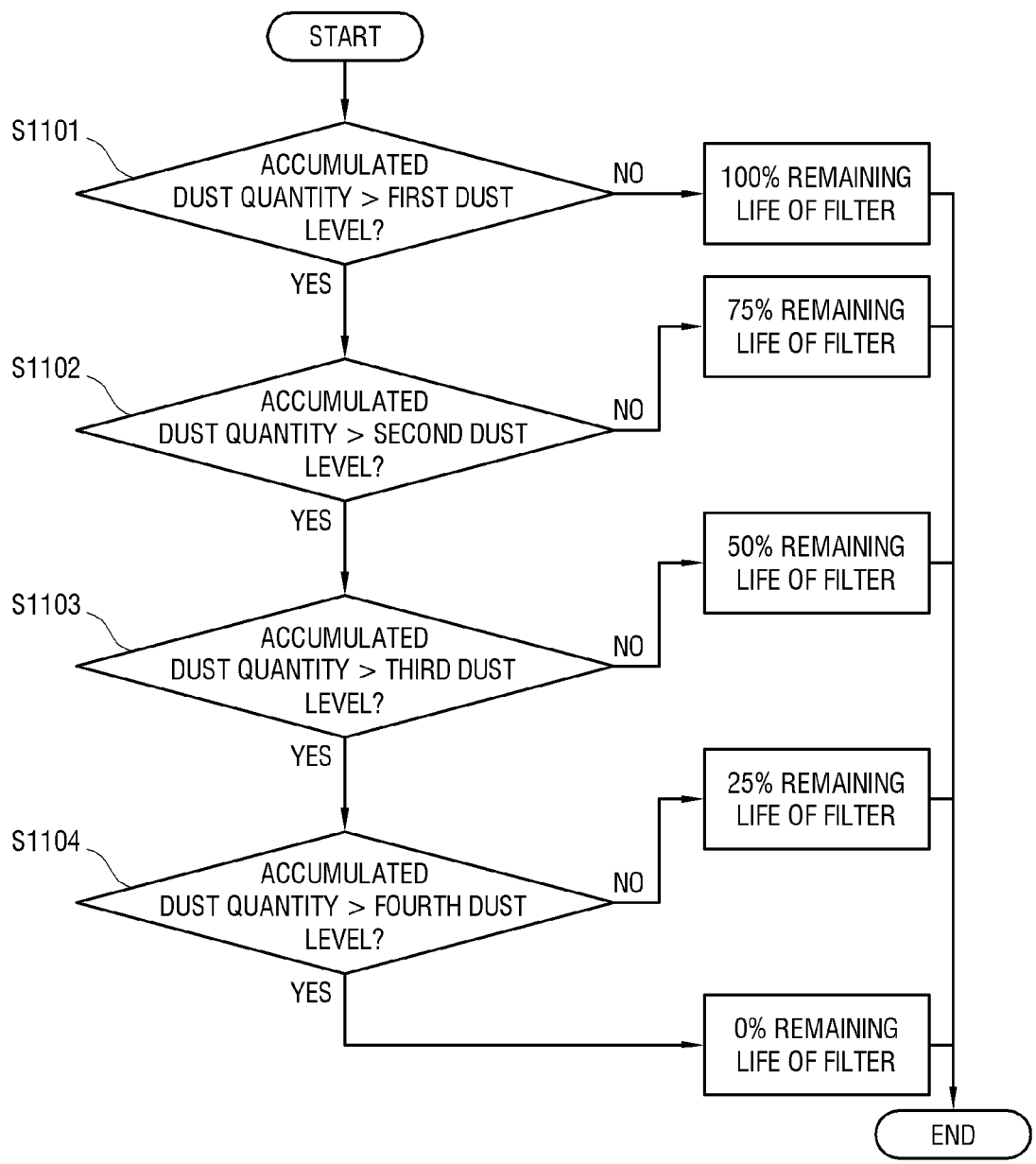
FIG. 11 shows a flowchart of identifying a remaining life of an air conditioner according to an embodiment of the disclosure.

FIG. 11 shows a flowchart of identifying a remaining life of an air conditioner according to an embodiment of the disclosure. The flowchart of FIG. 11 is based on the description of FIG. 10. Below, it will be described that the processor 410 identifies the remaining life of the filter based on the measured dust quantity.

The processor 410 analyzes information about the accumulated dust quantity measured so far based on information stored in the storage 430 or another piece of information.

The processor 410 identifies whether the accumulated dust quantity is more than 'A' mg corresponding to the first dust level (operation S1001). When it is identified that the accumulated dust quantity is not more than 'A' mg ('NO' in the operation S1101), the processor 410 identifies that the filter has a 100% remaining life.

When it is identified that the accumulated dust quantity is more than 'A' mg ('YES' in the operation S1101), the processor 410 identifies whether the accumulated dust quantity is more than 'B' mg corresponding to the second dust level (operation S1102). When it is identified that the accumulated dust quantity is not more than 'B' mg ('NO' in the operation S1102), the processor 410 identifies that the accumulated dust quantity is the first dust level and identifies that the filter has a 75% remaining life.

When it is identified that the accumulated dust quantity is more than 'B' mg ('YES' in the operation S1102), the processor 410 identifies whether the accumulated dust quantity is more than 'C' mg corresponding to the third dust level (operation S1103). When it is identified that the accumulated dust quantity is not more than 'C' mg ('NO' in the operation S1103), the processor 410 identifies that the accumulated dust quantity is the second dust level and identifies that the filter has a 50% remaining life.

When it is identified that the accumulated dust quantity is more than 'C' mg ('YES' in the operation S1103), the processor 410 identifies whether the accumulated dust quantity is more than 'D' mg corresponding to the fourth dust level (operation S1104). When it is identified that the accumulated dust quantity is not more than 'D' mg ('NO' in the operation S1104), the processor 410 identifies that the accumulated dust quantity is the third dust level and identifies that the filter has a 25% remaining life.

When it is identified that the accumulated dust quantity is more than 'D' mg ('YES' in the operation S1104), the processor 410 identifies that the accumulated dust quantity is the fourth dust level and identifies that the filter has a 0% remaining life.

The processor 410 may output the identified accumulated dust quantity level through the user interface 440.

Referring back to FIG. 10, the factor of the use time will be described below (see '1010').

A limit operation time remaining until the filter needs to be replaced according to the use of the air conditioner 100 may be obtained by experimental values. The processor 410 may estimate the current performance of the filter based on the current use time and the limit operation time. The filters may be different in the limit operation time, and the limit operation time may have been stored in the storage 430. It will be assumed that the limit operation time of a specific filter is 'D' hours. Values of 'A', 'B' and 'C' may correspond to 25%, 50% and 75% of 'D', respectively. For example, when 'D' is 10,000, 'A' is 2,500; 'B' is 5,000; and 'C' is 7,500.

A first time level refers to a case where the use time of the air-blowing motor 451 since the replacement of the filter is longer than or equal to 'A' hours. When it is identified that the use time is shorter than 'A' hours, the processor 410 may identify that the filter shows 100% performance. When it is identified that the use time is longer than 'A' hours, the processor 410 may identify that the current time level is the first time level and identify that the filter shows 75% performance.

A second time level refers to a case where the use time of the air-blowing motor 451 since the replacement of the filter is longer than or equal to 'B' hours. 'B' hours are a value corresponding to about ²⁄₄ of the limit operation time, and the value of 'B' may be varied depending on the kinds of filters. When it is identified that the use time is shorter than 'B' hours, the processor 410 may identify that the filter shows 75% performance. When it is identified that the use time is longer than 'B' hours, the processor 410 may identify that the current time level is the second time level and identify that the filter shows 50% performance.

A third time level refers to a case where the use time of the air-blowing motor 451 since the replacement of the filter is longer than or equal to 'C' hours. 'C' hours are a value corresponding to about ¾ of the limit operation time, and the value of 'C' may be varied depending on the kinds of filters. When it is identified that the use time is shorter than 'C' hours, the processor 410 may identify that the filter shows 50% performance. When it is identified that the use time is longer than 'C' hours, the processor 410 may identify that the current time level is the third time level and identify that the filter shows 25% performance.

A fourth time level refers to a case where the use time of the air-blowing motor 451 since the replacement of the filter is longer than or equal to 'D' hours. 'D' hours are a value corresponding to about the limit operation time, and the value of 'D' may be varied depending on the kinds of filters. When it is identified that the use time is shorter than 'D' hours, the processor 410 may identify that the filter shows 25% performance. When it is identified that the use time is longer than 'D' hours, the processor 410 may identify that the current time level is the fourth time level and identify that the filter shows 0% performance. The processor 410 may output the hour or dust value corresponding to the current level through the user interface 440. Below, descriptions will be made with reference to FIG. 11 under the conditions described with reference to FIGS. 9 and 10.

Figure 12:
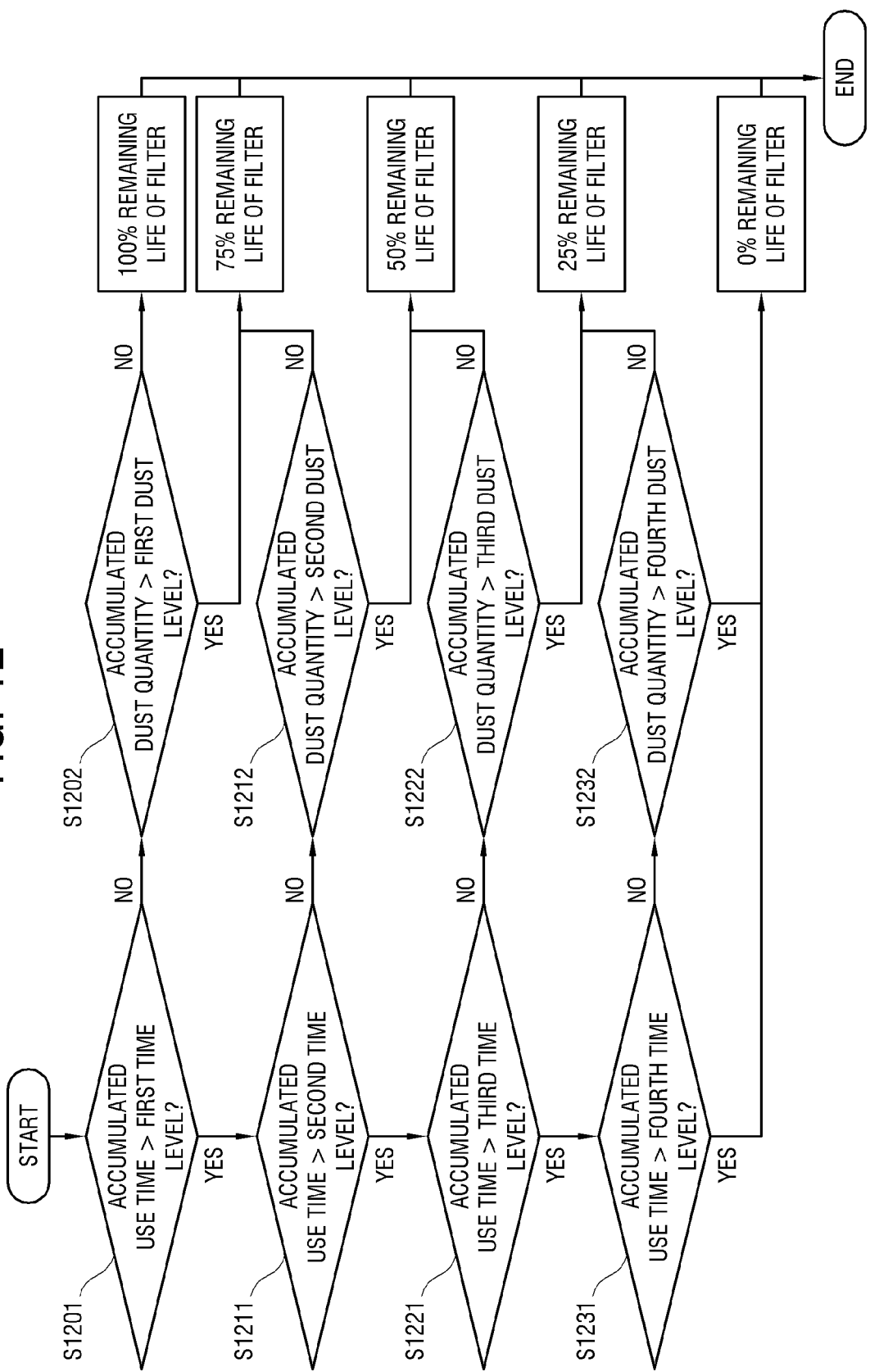
FIG. 12 shows a flowchart of identifying a remaining life of an air conditioner according to another embodiment of the disclosure.

FIG. 12 shows a flowchart of identifying a remaining life of an air conditioner according to another embodiment of the disclosure. The flowchart of FIG. 12 is based on the descriptions of FIGS. 10 and 11. Below, it will be described that the processor 410 identifies the remaining life of the filter based on the accumulated use time and the measured dust quantity.

The processor 410 analyzes information about the accumulated use time and information about the accumulated dust quantity measured so far based on information stored in the storage 430 or another piece of information.

The processor 410 identifies whether the accumulated use time is longer than 'A' hours corresponding to the first time level (operation S1201). When it is identified that the accumulated use time is not longer than 'A' hours ('NO' in the operation S1201), the processor 410 identifies whether the accumulated dust quantity is more than 'A' mg corresponding to the first dust level (operation S1202). When it is identified that the accumulated dust quantity is not more than 'A' mg ('NO' in the operation S1202), the processor 410 identifies that the filter has a 100% remaining life. When it is identified that the accumulated dust quantity is more than 'A' mg ('YES' in the operation S1202), the processor 410 identifies that the accumulated dust quantity is the first dust level and identifies that the filter has a 75% remaining life.

When it is identified that the accumulated use time is longer than 'A' hours ('YES' in the operation S1201), the processor 410 identifies whether the accumulated use time is longer than 'B' hours corresponding to the second time level (operation S1211). When it is identified that the accumulated use time is not longer than 'B' hours ('NO' in the operation S1211), the processor 410 identifies that the time level is the first time level and identifies whether the accumulated dust quantity is more than 'B' mg corresponding to the second dust level (operation S1212). When it is identified that the accumulated dust quantity is not more than 'B' mg ('No' in the operation S1212), the processor 410 identifies that the dust level is the first dust level and identifies that the filter has a 50% remaining life.

When the accumulated use time is longer than 'B' hours ('YES' in the operation S1211), the processor 410 identifies whether the accumulated use time is longer than 'C' hours corresponding to the third time level (operation S1221). When it is identified that the accumulated use time is longer than 'C' hours ('NO' in the operation S1221), the processor 410 identifies that the time level is the second time level and identifies whether the accumulated dust quantity is more than 'C' mg corresponding to the third dust level (operation S1222). When it is identified that the accumulated dust quantity is not more than 'C' mg ('NO' in operation S1222), the processor 410 identifies that the dust level is the second dust level and identifies that the filter has a 50% remaining life. When it is identified that the accumulated dust quantity is more than 'C' mg ('YES' in the operation S1222), the processor 410 identifies that the dust level is the third dust level and identifies that the filter has a 25% remaining life.

When it is identified that the accumulated use time is longer than 'C' hours ('YES' in the operation S1221), the processor 410 identifies whether the accumulated use time is longer than 'D' hours corresponding to the fourth time level (operation S1231). When it is identified that the accumulated use time is not longer than 'D' hours ('NO' in the operation S1231), the processor 410 identifies whether the accumulated dust quantity is more than 'D' mg corresponding to the fourth dust level (operation S1232). When it is identified that the accumulated dust quantity is not more than 'D' mg ('No' in the operation S1232), the processor 410 identifies that the dust level is the third dust level and identifies that the filter has a 25% remaining life. When it is identified that the accumulated dust quantity is more than 'D' mg ('YES' in the operation S1232), the processor 410 identifies that the dust level is the fourth dust level and identifies that the filter has a 0% remaining life. Further, when it is identified that the accumulated use time is longer than 'D' hours ('YES' in the operation S1231), the processor 410 identifies the time level is the fourth time level and identifies that the filter has a 0% remaining life.

The remaining life of the filter does not depend on only the two limited factors of the accumulated dust quantity and the accumulated use time. For example, the remaining life of the filter may vary depending on the accumulated dust quantity, the air volume, the use time, and the kinds of dust. Therefore, the processor 410 may differently identify the remaining life of the filter based on combination of the accumulated dust quantity, the air volume, the use time, and the kinds of dust.

The invention claimed is:

1. An air conditioner comprising:
a housing comprising an inlet and an outlet through which air is introduced and discharged;
a fan driver configured to drive the air introduced through the inlet to be discharged through the outlet;
a filter configured to filter the air;
a sensor configured to detect foreign materials, the foreign materials including a first foreign material and a second foreign material having a different size from a size of the first foreign material in the air; and
a processor configured to:
identify a first mass concentration of the first foreign material and a second mass concentration of the second foreign material in the air detected by the sensor, and
calculate a remaining life of the filter based on the first mass concentration and the second mass concentration.

2. The air conditioner according to claim 1, wherein
the processor is configured to identify the first mass concentration and the second mass concentration by detecting a laser reflected from the foreign materials using the sensor.

3. The air conditioner according to claim 2, wherein
the sensor is configured to emit the laser to the air and detect scattering levels of the laser reflected from the foreign materials, and
the processor is configured to identify the first mass concentration and the second mass concentration based on the detected scattering levels.

4. The air conditioner according to claim 1, wherein the filter is provided at a side of the inlet, and configured to filter the air introduced through the inlet.

5. The air conditioner according to claim 1, wherein the sensor is provided in a space isolated from a channel.

6. The air conditioner according to claim 1, wherein the sensor is provided near the inlet.

7. The air conditioner according to claim 6, wherein the sensor is configured to detect the foreign materials in the air in a channel between the inlet and the filter.

8. The air conditioner according to claim 1, wherein the processor is configured to calculate accumulated dust quantity of the filter based on the first mass concentration and the second mass concentration.

9. The air conditioner according to claim 8, wherein the processor is configured to calculate the accumulated dust quantity based on use time of the air conditioner, an air volume value, the first mass concentration and the second mass concentration in the air.

10. The air conditioner according to claim 9, wherein the processor is configured to compensate for the air volume value based on at least one of the use time or the accumulated dust quantity.

11. A method of controlling an air conditioner comprising a housing, a fan driver, a filter, and a sensor, the method comprising:
detecting, by the sensor, foreign materials in air, the air being introduced through an inlet of the housing, the foreign materials including a first foreign material and a second foreign material having a different size from a size of the first foreign material in the air;
identifying a first mass concentration of the first foreign material and a second mass concentration of the second foreign material in the air; and
calculating a remaining life of the filter based on the first mass concentration and the second mass concentration.

12. The method according to claim 11, further comprising:
 identifying the first mass concentration and the second mass concentration by detecting a laser reflected from the foreign materials using the sensor.

13. The method according to claim 12, further comprising:
 emitting, by the sensor, the laser to the air and detecting scattering levels of the laser reflected from the foreign materials; and
 identifying the first mass concentration and the second mass concentration based on the detected scattering levels.

\* \* \* \* \*